(No Model.)
H. BEEBE.
COFFEE PERCOLATOR.
No. 257,641. Patented May 9, 1882.
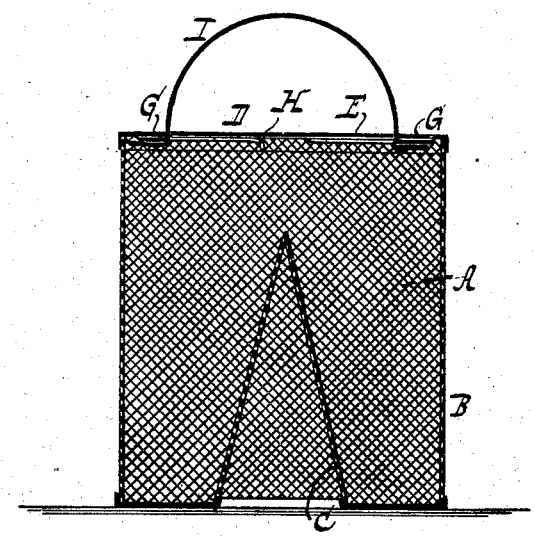
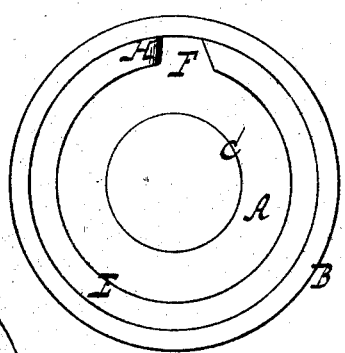
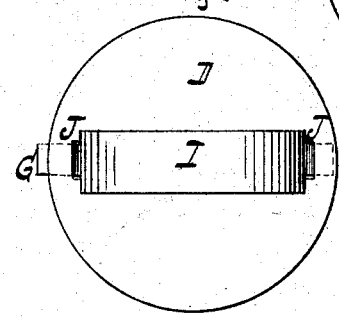
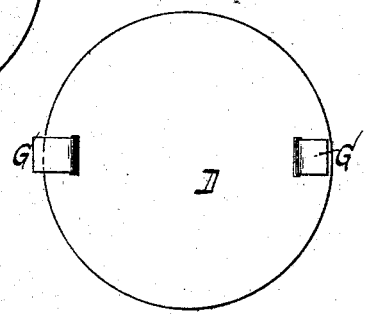
WITNESSES:
William Miller
Ernst F. Kastenhuber
INVENTOR
Henry Beebe
BY Van Santvoord & Hauff
ATTORNEYS

United States Patent Office.

HENRY BEEBE, OF JERSEY CITY, NEW JERSEY.

COFFEE-PERCOLATOR.

SPECIFICATION forming part of Letters Patent No. 257,641, dated May 9, 1882.

Application filed March 21, 1882. (No model.)

*To all whom it may concern:*

Be it known that I, HENRY BEEBE, a citizen of the United States, residing at Jersey City Heights, in the county of Hudson and State of New Jersey, have invented new and useful Improvements in Coffee-Percolators, of which the following is a specification.

This invention relates to coffee-percolators or biggins, and especially that class thereof designed to be placed loosely into the coffee-pot with a supply of ground coffee.

The object of the invention is to improve the means employed for securing the removable and replaceable lid or cover in position on the percolating-vessel, whereby the handle is united to the lid or cover, and parts of said handle serve as catches to lock the latter in position.

The invention is clearly illustrated in the accompanying drawings, in which—

Figure 1 represents a vertical central section. Fig. 2 is a plan or top view of the vessel. Fig. 3 is a plan view of the lid. Fig. 4 is an inverted plan view thereof.

Similar letters indicate corresponding parts.

The letter A designates the body of the vessel; B, the outer wall and C the inner wall thereof, and D the lid. Both of the walls B C are perforated or foraminous, the same being made of sheet metal, wire-gauze, or other similar material, and the inner wall is tapered in an upward direction, so that it takes the form of a cone, while it terminates below the top of the vessel. When the vessel is placed in a coffee-pot the water passes and repasses through the walls B C, thus percolating the ground coffee that may be contained in the vessel, and by the conical shape of the inner wall the whole area thereof is presented to the water rising within it by ebullition. Another advantage gained by the shape and arrangement of the inner wall, C, is that it facilitates the removal of the ground coffee and the cleansing of the entire vessel.

When the vessel is applied to use the lid D is locked thereto; and the lid-locking devices consist of a flange, E, formed on the upper edge of the vessel, projecting inwardly and having a notch, F, therein, in connection with catches G upon the lid, adapted to engage the flange, these catches being so arranged that by inserting one beneath the flange the other can also be brought thereunder by passing the same through the notch and then rotating the lid, its movement being limited by a stop, H, which is formed by bending one end of the notch downward into the path of one of the catches. The lid is provided with a handle, I, of bowed shape, which is formed integral with the catches G—namely, by extending the handle at its opposite ends through the lid, and thence outward, the projecting portion constituting the catches, and being of reduced width, so as to form shoulders J at the opposite ends of the handle proper, impinging or resting against the lid.

What I claim as new, and desire to secure by Letters Patent, is—

1. A coffee-percolator of the character described, combining in its structure the percolating-vessel provided at its upper end with an inwardly-projecting flange, E, having a notch, F, a removable and replaceable lid or cover, D, and a handle, I, having its ends extended through the lid or cover into the form of catches G, which project from the edges of the latter, substantially as described.

2. A coffee-percolator combining in its structure the percolating-vessel provided at its upper edge with an inwardly-projecting flange, E, having the notch F, and downwardly-projecting stop H, a removable and replaceable lid or cover, D, and a handle, I, having its ends extended through the lid or cover in the form of catches G, which project from the edges of the latter, substantially as described.

In testimony whereof I have hereunto set my hand and seal in the presence of two subscribing witnesses.

HENRY BEEBE. [L. S.]

Witnesses:
E. F. KASTENHUBER,
J. HERMANN WAHLERS.